(12) United States Patent
Tjahjono et al.

(10) Patent No.: US 9,247,417 B2
(45) Date of Patent: Jan. 26, 2016

(54) ENCAPSULATING RECEIVED MULTICAST TRAFFIC IN UNICAST IP PACKETS TO SUPPORT DISTRIBUTION OF MULTICAST TRAFFIC THROUGH A MESH NETWORK

(71) Applicants: Danu Tjahjono, Dublin, CA (US); Wenge Ren, Sunnyvale, CA (US); Amalavoyal Narasimha Chari, Menlo Park, CA (US); Balaji Rajavelu, Milpitas, CA (US)

(72) Inventors: Danu Tjahjono, Dublin, CA (US); Wenge Ren, Sunnyvale, CA (US); Amalavoyal Narasimha Chari, Menlo Park, CA (US); Balaji Rajavelu, Milpitas, CA (US)

(73) Assignee: ABB Inc., Cary, NC (US)

( * ) Notice: Subject to any disclaimer, the term of this patent is extended or adjusted under 35 U.S.C. 154(b) by 142 days.

(21) Appl. No.: 14/156,320

(22) Filed: Jan. 15, 2014

(65) Prior Publication Data
US 2015/0201323 A1 Jul. 16, 2015

(51) Int. Cl.
*H04W 84/18* (2009.01)
*H04L 12/18* (2006.01)
*H04W 8/18* (2009.01)
*H04W 4/06* (2009.01)
*H04L 12/931* (2013.01)

(52) U.S. Cl.
CPC .............. *H04W 8/186* (2013.01); *H04L 12/185* (2013.01); *H04W 4/06* (2013.01); *H04W 84/18* (2013.01); *H04L 49/201* (2013.01)

(58) Field of Classification Search
None
See application file for complete search history.

(56) References Cited

U.S. PATENT DOCUMENTS

| 2008/0181161 A1* | 7/2008 | Gi Kim et al. ................ 370/312 |
| 2009/0201844 A1* | 8/2009 | Bhatti et al. ................. 370/312 |
| 2012/0207159 A1* | 8/2012 | Buchko et al. ............... 370/390 |

OTHER PUBLICATIONS

Yan, IP Multicast, Oct. 14, 2004, http://www.csee.umbc.edu/~pmundur/courses/CMSC691M-04/fang-MBone.ppt, 50 pages.*
Goyeneche, Multicast over TCP/IP HOWTO, Mar. 1998, http://www.tldp.org/HOWTO/Multicast-HOWTO.html, 27 pages.*

* cited by examiner

*Primary Examiner* — Hoon J Chung
(74) *Attorney, Agent, or Firm* — Brian R. Short (57) ABSTRACT

Systems, methods and apparatuses of supporting multicast traffic of a wireless mesh network are disclosed. One apparatus includes an access node that includes one or more transceivers for communicating with other devices of a wireless mesh network, and a processor. The processor is operative to receive multicast traffic from a multicast traffic source through the one or more transceivers, associate the multicast traffic with a multicast group ID, and encapsulate the received multicast traffic in unicast IP packets that include a special destination IP address associated with the multicast group ID.

24 Claims, 8 Drawing Sheets

Exemplary Multicast
Distribution
Tables
Of Access Node N1

| Down Stream Device Identifier | Multicast Group Membership |
|---|---|
| N2 | X, Y |
| N3 | ---- |
| N4 | Z |
| N5 | W, X, Y |
| C1 | W, X |
| C2 | Y, Z |

Multicast
Distribution
Table
(First Embodiment)
410

| Down Stream Device Identifier | Route | Multicast Group Membership |
|---|---|---|
| N2 | Direct | X, Y |
| N3 | Direct | ---- |
| N4 | Through N3 | Z |
| N5 | Through N3 | W, X, Y |
| C1 | Through N3 | W, X |
| C2 | Through N3 | Y, Z |

Multicast
Distribution
Table
(Second Embodiment)
420

ENCAPSULATING RECEIVED MULTICAST TRAFFIC IN UNICAST IP PACKETS TO SUPPORT DISTRIBUTION OF MULTICAST TRAFFIC THROUGH A MESH NETWORK

FIELD OF THE DESCRIBED EMBODIMENTS

The described embodiments relate generally to wireless communications. More particularly, the described embodiments relate to systems, methods and apparatuses for distributing multicast traffic through a wireless mesh network.

BACKGROUND

In computer networking, broadcast includes the delivery of a message or information to a group of destination computers simultaneously in a single transmission from the source. For an embodiment, broadcast is implemented as an IP broadcast or the layer-2 broadcast which may include non-IP frames. However, presently, layer 3 (IP based) mesh networks cannot send layer 2 broadcast frames natively and reliably.

In order for broadcast to operate properly in a wireless mesh network, routers within the wireless mesh network need to know whether any client devices connected to the wireless mesh network are a member of a broadcast group.

It is desirable to have methods, systems and apparatuses for implementing a wireless mesh network that provides broadcasting information to a client device of the wireless mesh network.

SUMMARY

An embodiment includes a wireless access node. The wireless access node includes one or more transceivers for communicating with other devices of a wireless mesh network, and a processor. The processor is operative to receive multicast traffic from a multicast traffic source through the one or more transceivers, associate the multicast traffic with a multicast group ID, and encapsulate the received multicast traffic in unicast IP packets that include a special destination IP address associated with the multicast group ID.

An embodiment includes method of method of supporting multicast traffic of a wireless mesh network. The method includes receiving, by a wireless access node of the wireless mesh network, multicast traffic from a multicast traffic source through the one or more transceivers, associating the multicast traffic with a multicast group ID, and encapsulating the received multicast traffic in unicast IP packets that include a special destination IP address associated with the multicast group ID.

Other aspects and advantages of the described embodiments will become apparent from the following detailed description, taken in conjunction with the accompanying drawings, illustrating by way of example the principles of the described embodiments.

DETAILED DESCRIPTION

The embodiments described provide systems, methods and apparatuses for distributing multicast traffic through a wireless mesh network. For at least some embodiments, access nodes within a wireless mesh network receive a user configuration from a network operator wherein the user configuration includes an indication that a downstream access node or downstream client device connected to the access node is to receive specific multicast information. Further, for at least some embodiments, the access nodes provide a multicast membership notification to any upstream access nodes and an upstream gateway, wherein the multicast membership notification includes multicast protocol information of the downstream access node or downstream client device.

For an embodiment, the upstream access nodes and the upstream gateway establish multicast distribution tables based on the multicast membership notifications. After the upstream access nodes and the gateway have received the multicast membership notifications and established the multicast distribution tables, the upstream access nodes and the gateway know how to propagate multicast traffic that matches the specific multicast information downstream to the downstream access node or downstream client device.

It is to be understood that while the following descriptions may be focused on multicast traffic, the described embodiments can be applied to broadcast traffic. Multicast is a term used to describe communication where a piece of information is sent from one or more points to a set of other points. In this case there, may be one or more senders, and the information is distributed to a set of receivers, where the set of multicast receivers may be empty or may contain multiple receivers. Broadcast is a term used to describe communication where a piece of information is sent from one point to all other points that are within the same Layer 2 domain, or broadcast domain. In this case there is just one sender, but the information is sent to all connected receivers that are within the broadcast domain.

Broadcast transmissions typically only reach recipients that are within the same Layer 2 domain (for example, connected together through a hub or within the same wireless broadcast neighborhood). Broadcast transmissions typically do not propagate through Layer 3 routers, which isolate broadcast domains from each other. By contrast, IP-based multicast allows the multiple recipients to be located in different broadcast domains, so long as they're reachable via IP transmissions and so long as the intermediate routers support IP multicast.

Figure 1:
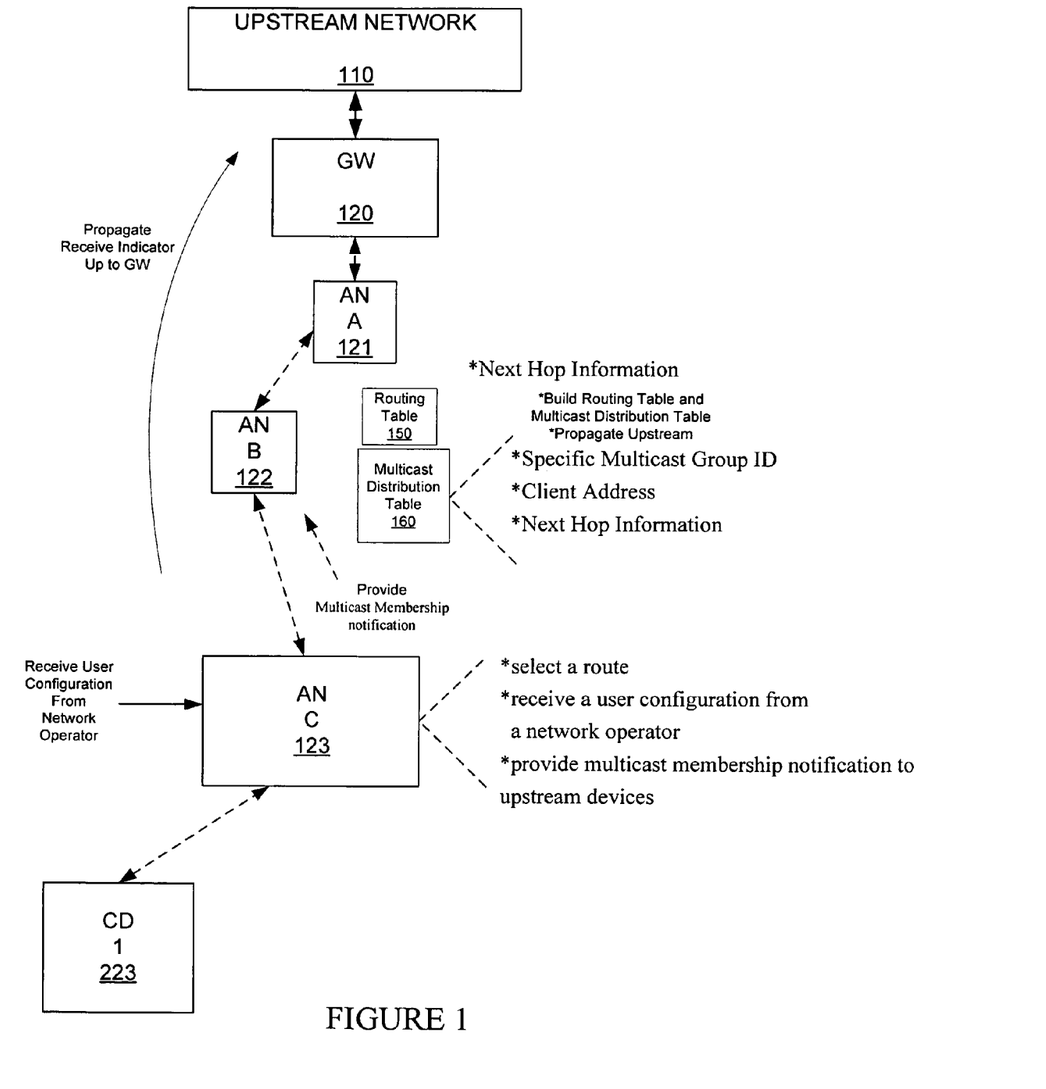
FIG. 1 shows a wireless network that includes a gateway, multiple access nodes and a client device, wherein the client device is to receive multicast traffic, according to an embodiment.

FIG. 1 shows a wireless network that includes a gateway 120, multiple access nodes 121, 122, 123 and a client device 223, wherein the client device 223 is to receive multicast information, according to an embodiment. It is to be noted that while some descriptions are directed to a downstream client receiving multicast traffic, the descriptions are also applicable to a downstream access node receiving the multicast traffic. That is, both client devices and access nodes can be members of a multicast group.

As shown, a gateway 120 is interfaced with an upstream network 110. The gateway 120 typically includes a high-bandwidth connection to the upstream network 110 which can be wired or wireless. Further, the upstream network 110 can include wired and wireless links. For an embodiment, the gateway 120 is an access node that originates routing beacons. As shown, the mesh network includes the multiple access nodes 121, 122, 123, and the client device 223 which is connected to the access node C 123.

For at least some embodiments, each of the access nodes 121, 122, 123 selects a routing path to the gateway 120. Through the routing path(s), the access nodes 121, 122, 123 are coupled either directly or indirectly to the gateway 120. That is, each access node is either directly connected to the upstream gateway 120, or indirectly connected through another access node to the upstream gateway 120. Many factors can be included in the decision of which access nodes or gateways each access node is connected. Clearly, the network of FIG. 1 can include any number of additional gateways and/or access nodes.

For an embodiment, the gateway 120 broadcasts routing packets (beacons), which can be used to determine routing between the access nodes 121, 122, 123 and the gateways 120 of the network. For this embodiment, the routing beacons are received by all first-level access nodes (for example, access node 121), which are access nodes that are able to receive gateway transmitted beacons, and directly route data through to the gateway 120.

As previously stated, for an embodiment, the beacons are used to establish a route from each access node to the gateway. For an embodiment, the first level access nodes re-broadcast the beacon data, attaching their own information to the routing beacon. The information indicates to the second level access nodes that the path to the gateway includes the first level access node. The wireless mesh network can include any number of levels of access nodes.

As shown, the access node C 123 receives a user configuration from a network operator. For an embodiment, the access node has an accessible webpage that provides control and status of the access node. For an embodiment, the operator accesses and manages the user configuration through the accessible web page of the access node. For an embodiment, the network operator provides the user configuration through the web page of the access node. For an embodiment, the specific multicast information includes the multicast protocol, for example UDP protocol or GOOSE protocol, and the port number. For at least some embodiments, the multicast protocol includes the data protocol (IP or non-IP) used by the multicast traffic (for example, IP/UDP, GOOSE, etc.).

For an embodiment, the user configuration is received, for example, from an external device. That is, an external device (operating, for example, as a network manager) accesses the access node and set the configuration.

For at least some embodiments, the user configuration includes an indication that a client device 223 connected to the access node C 123 is to receive specific multicast information. It is to be understood that the user configurations can additionally or alternatively be used to indicate that a downstream access node connected to the access node C 123 is to receive specific multicast information. For at least some embodiments, the specific multicast information includes a multicast protocol, for example UDP (User Diagram Protocol) protocol or GOOSE protocol, and the port number. Further, the specific multicast information includes an interface the client utilizes in connecting to the access node, such as, wired Ethernet, or wireless.

Once the access node C 123 has received the user configuration, for at least some embodiments, the access node C123 provides a multicast membership notification to any upstream access nodes and an upstream gateway, wherein the multicast membership notification includes multicast protocol information of the client device. For at least some embodiments, the multicast membership notification provides an indicator to the upstream access node that there is a multicast group listener in its downstream. A listener is a multicast-receiving device such as an access node or a client device. For at least some embodiments, the information of the multicast membership notification includes the MAC (media access control)-address of the connecting access node 123 that the client device 223 is connected to and the multicast protocol information the listener (client device 223) is subscribed to. This multicast membership notification is sent (propagated upstream) to the upstream node (upstream access node or upstream gateway) of the connecting access node. For at least some embodiments, a routing table 150 of each access node includes information about the upstream access nodes of the access node—as determined by the previously described routing selections. The upstream access node keeps this multicast membership notification, and also the interface where this multicast membership notification is received from so that the access node knows where to send the multicast data to. For an embodiment, the access node can simply keep that multicast membership notification and the interface information in a multicast distribution table 160, and use the multicast distribution table 160 in conjunction with the routing table 150 of the access node for routing multicast traffic. As will be describe, for at least some embodiments the multicast distribution table 160 and the routing table 150 are maintained separately. For at least some other embodiments, the multicast distribution table 160 and the routing table 150 are maintained jointly.

For at least some embodiments, the multicast protocol includes the data protocol (IP or non-IP) used by the multicast traffic (for example, IP/UDP, GOOSE, etc.).

Further, for at least some embodiments, each upstream access node propagates the multicast membership notification up through all upstream access nodes (that is, for example, access nodes 122, 121) until provided to the upstream gateway 120. Once propagated up through all the upstream access nodes and the gateway, once any of the upstream access nodes or the gateway receives multicast traffic that matches multicast protocol information of the downstream client device 223, the access node forwards the matched multicast traffic downstream towards the access node 123 and the client device 223, as determined by the multicast membership notification and the routing table 150.

Figure 2:
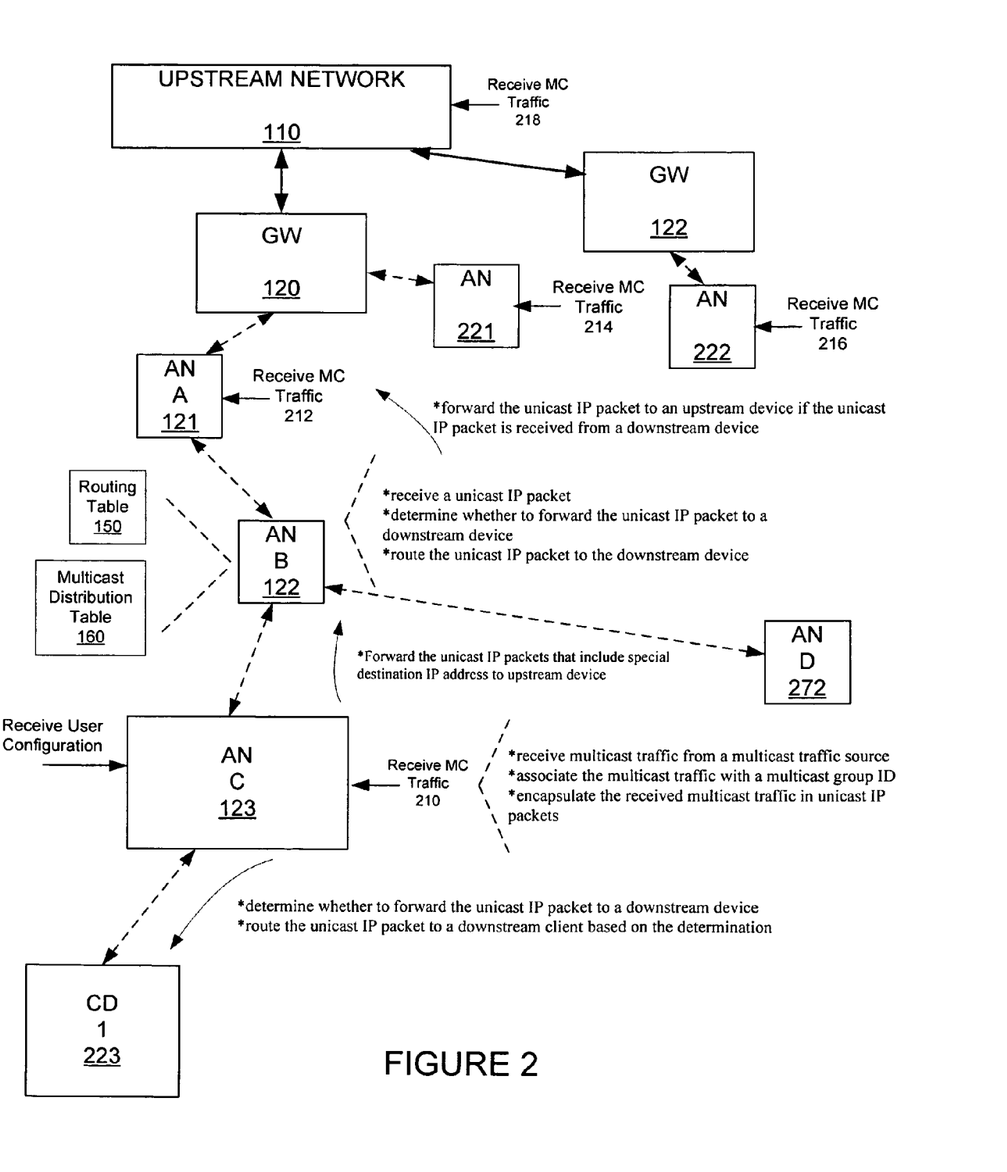
FIG. 2 shows a wireless network that includes a gateway, multiple access nodes and client devices, wherein multicast traffic is received at different locations within the wireless network, and distributed through the network, according to an embodiment.

FIG. 2 shows a wireless network that includes a gateway 120, multiple access nodes 121, 122, 123, 221, 222 and a client device 223, wherein multicast information or multicast traffic is received at different locations within the wireless network, according to an embodiment. The multicast information being received from different sources is described in terms of different multicast scenarios.

The multicast source can include, for example, a client device connected to the Ethernet interface of access node that sends UDP data on a specific port number using broadcast/ multicast IP address (255.255.255.255), or multicast IP address (224.x.y.z), or Goose protocol.

For at least some embodiments, when the access node C 123 or any of the other access nodes of the wireless mesh network receive multicast traffic from a multicast traffic source, the receiving access node encapsulates the received multicast traffic in IP packets that include a special destination IP address. For at least some embodiments, encapsulating the multicast data in a UDP packet includes the multicast data being transmitted as the payload of a new IP/UDP packet. More specifically, for an embodiment, the access node receives multicast traffic from a multicast traffic source, associates the multicast traffic with a multicast group ID, and encapsulates the received multicast traffic in unicast IP packets that include a special destination IP address associated with the multicast group ID. For an embodiment, the unicast IP packets contain the multicast group ID.

For at least some embodiments, the special destination IP address includes an IP address only known within the mesh network (for example, 10.11.12.13). The packet with the special destination IP address is sent and forwarded hop by hop (that is, from access node to access node) and is processed by each access node using the multicast distribution table. This IP address is used in the destination field of the IP header of the encapsulated packet. Also note that this is a unicast IP (that is, the encapsulated UDP packet is always sent using 'unicast' transmission between each wireless hop of the wireless mesh network).

For at least some embodiments, once the multicast traffic has been received and encapsulated into a unicast IP packet, the unicast IP packet is forwarded to an upstream device (upstream access node or upstream gateway). That is, when an access node of the wireless mesh network has received the multicast traffic, the wireless mesh network needs to make the multicast traffic available to devices both inside and outside of the wireless mesh network. Accordingly, each access node forwards the unicast IP packet upstream until the unicast IP packet is eventually forwarded up to one or more of the gateways of the wireless mesh network.

Based on the multicast distribution table 160 and the routing table 150, the access node determines whether to route the unicast IP packet downstream to a downstream access node or downstream client device.

Once the gateway receives the forwarded unicast IP packet from a downstream access node, the gateway then de-encapsulates the unicast IP packet and forwards the multicast traffic up to the upstream network when there is a client device in the upstream network that is to receive the multicast traffic. For an embodiment, when the gateway receives unicast IP packet from a downstream device, the gateway also sends the unicast IP packet over a backhaul network to all other gateways.

In addition to forwarding the multicast traffic upstream, the access node receiving the unicast IP packet forwards the received unicast IP packet to a downstream device if the received multicast traffic matches the multicast protocol information as indicated by the multicast membership notification of a downstream client device.

As shown, for at least some embodiments, the access node 123 receives multicast (MC) traffic from a multicast source 210. Further, the access node 210 associates the multicast traffic with a multicast group ID, and encapsulate the received multicast traffic in unicast IP packets that include a special destination IP address associated with the multicast group ID. Further, the access node 123 forwards the unicast IP packets that include special destination IP address to an upstream device, such as, upstream access node 122. Further, the access node 123 determines, based on the special destination IP address and a multicast group ID of a multicast distribution table, whether to forward the unicast IP packet to a downstream device, and routes the unicast IP packet to a downstream client based on the determination. Clearly, any of the access nodes can similarly perform these operations.

As shown, for at least some embodiments, the access node 123 receives a unicast IP packet that includes a special destination IP address through at least one of the one or more transceivers, determines, based on the special destination IP address and a multicast group ID of a multicast distribution table, whether to forward the unicast IP packet to a downstream device, and routes the unicast IP packet to the downstream device based on the determination. Further, the access node 123 forwards the unicast IP packet to an upstream device if the unicast IP packet is received from a downstream device. Clearly, any of the access nodes can similarly perform these operations.

Other multicast sources 212, 214, 126, 218 are additionally depicted in FIG. 2. The wireless mesh network can receive the multicast traffic of the multicast sources 212, 214, 126, 218 at various locations within the wireless mesh network. The propagation of the multicast traffic through the mesh network is enabled by the described embodiments.

Figure 3:
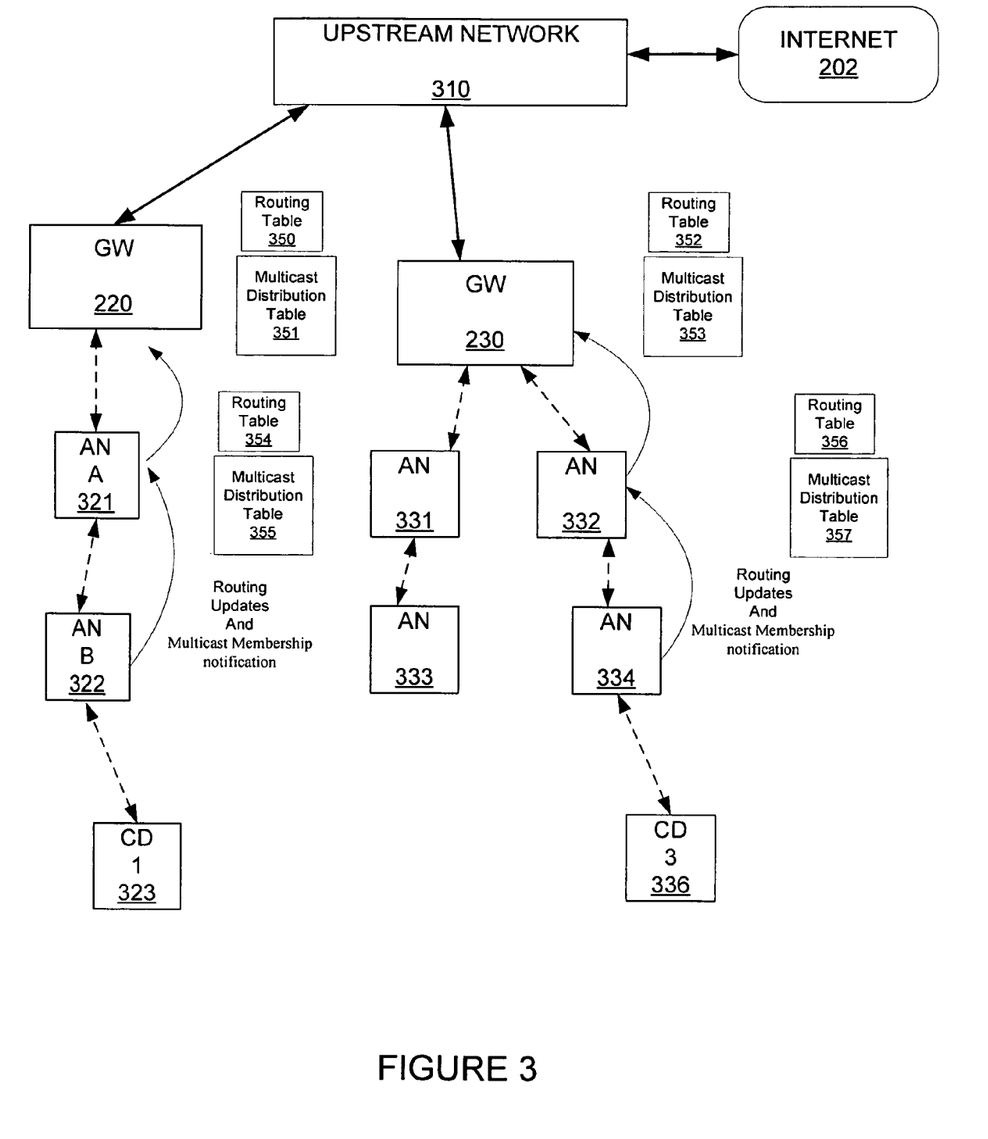
FIG. 3 shows a wireless network that includes multiple gateways, multiple access nodes, and client devices, wherein multicast distribution tables and routing tables of the access nodes are updated, according to an embodiment.

FIG. 3 shows a wireless network that includes multiple gateways 220, 230, multiple access nodes 321, 322, 331, 332, 333, 334, and client devices 323, 336, wherein the multicast membership notifications of the client devices 323, 336 are updated, according to an embodiment. This embodiment shows multiple gateways 220, 230 wherein each gateway 220, 230 maintains a routing table 350, 352, 354, 356 and multicast distribution tables 351, 353, 355, 357 (shown in FIG. 3 as a separate tables, but the tables can be maintained as a single table as well) for all access nodes and client device that are connected through the wireless mesh network to the gateways 220, 230. The gateways 220, 230 are connected to an upstream network 310, which can be connected, for example, to the internet 202. Each access node propagates the routing information and multicast distribution table information up to and through its upstream access nodes to its gateway. For example, access node 322 propagates its routing table information and multicast distribution table information up to access node 321, which in turn propagates its routing table information and multicast distribution table information up to gateway 220. When established, the routing and multicast distribution tables allow each access node and gateway to determine when and where to route multicast traffic.

Figure 4:
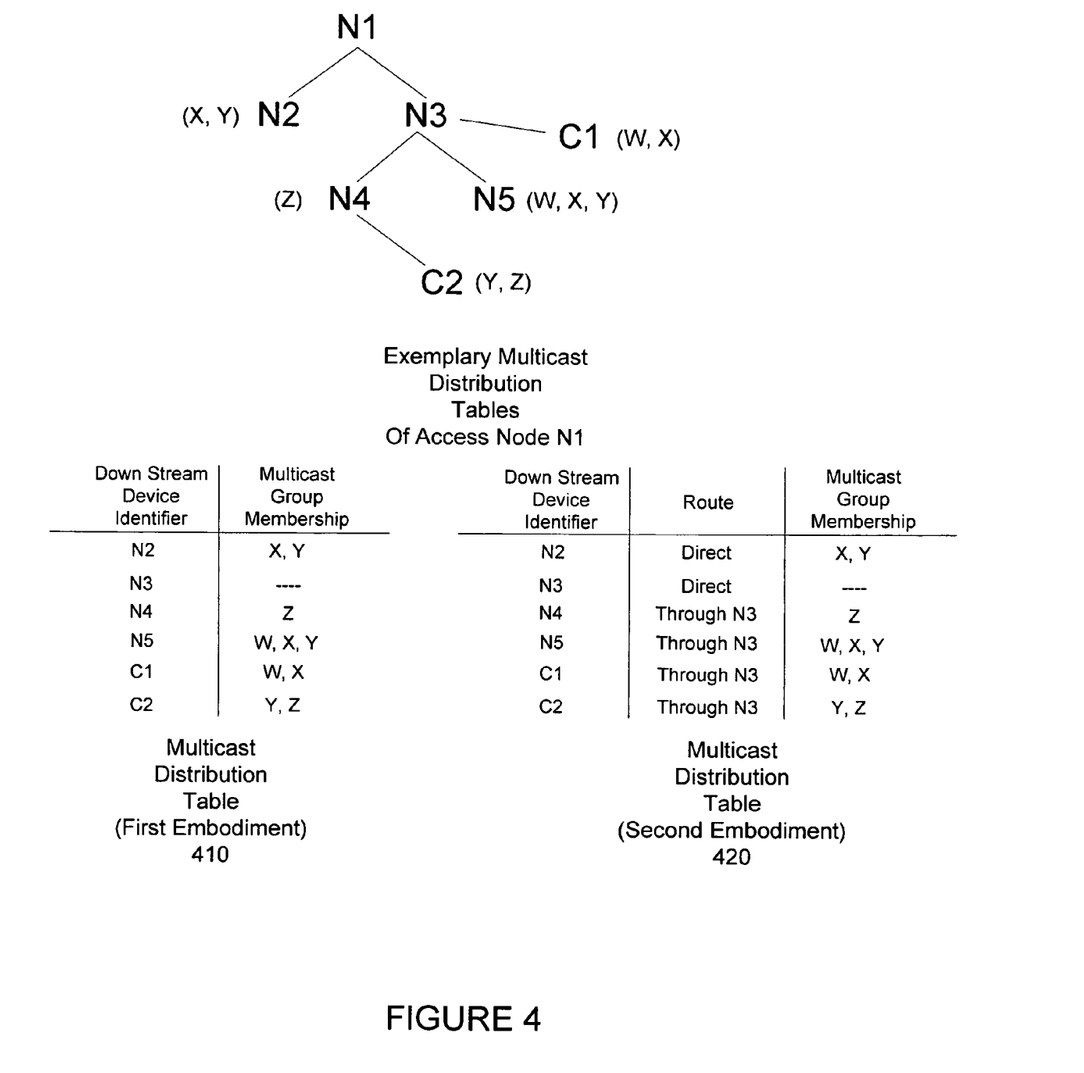
FIG. 4 shows multicast distribution tables, according to a couple of embodiments.

FIG. 4 shows multicast distribution tables, according to a couple of embodiments. An exemplary mesh network is shown that includes an access node N1, that is either directly, or indirectly connected (through a routing path) to access nodes N2, N3, N4, N5 and client devices C1, C2. As previously described, for an embodiment, each access node establishes a routing table and/or a multicast distribution table for the purposes of determining whether and where to route multicast traffic received by the access node.

A first embodiment of a multicast distribution table 410 includes a list of downstream device identifiers and a corresponding list of multicast group memberships. For an embodiment, the downstream device identifier for a downstream access node is an IP address. For an embodiment, the downstream device identifier for a downstream client device can be an IP address or some other type of identifier.

When the access node receives multicast traffic in the either directly or in the form of a unicast packet, the access node ultimately needs to determine whether to route or forward the multicast traffic to a downstream access node or client device. The multicast distribution table provides a means for making this determination. For an embodiment, a received unicast IP packet will include a special destination IP address. For an embodiment, a received unicast IP packet will include a multicast group ID. For an embodiment, the determination of whether to forward the unicast IP packet to a downstream device is based on the special destination IP address and a multicast group ID of the multicast distribution table. More specifically, for an embodiment, the determination of whether to forward the unicast IP packet includes identifying whether an IP address of the downstream device (downstream device identifier) is within the multicast distribution table corresponding to the multicast group ID.

For the first embodiment of a multicast distribution table 410, the access node must reference a routing table to determine how to route the multicast traffic to the downstream access node or downstream device. That is, for example, of routing to access node N5, the access node N1 must route the multicast traffic through the next hop access node N3.

A second embodiment of a multicast distribution table 420 includes a list of downstream device identifiers, a next hop route, and a corresponding list of multicast group memberships.

Figure 5:
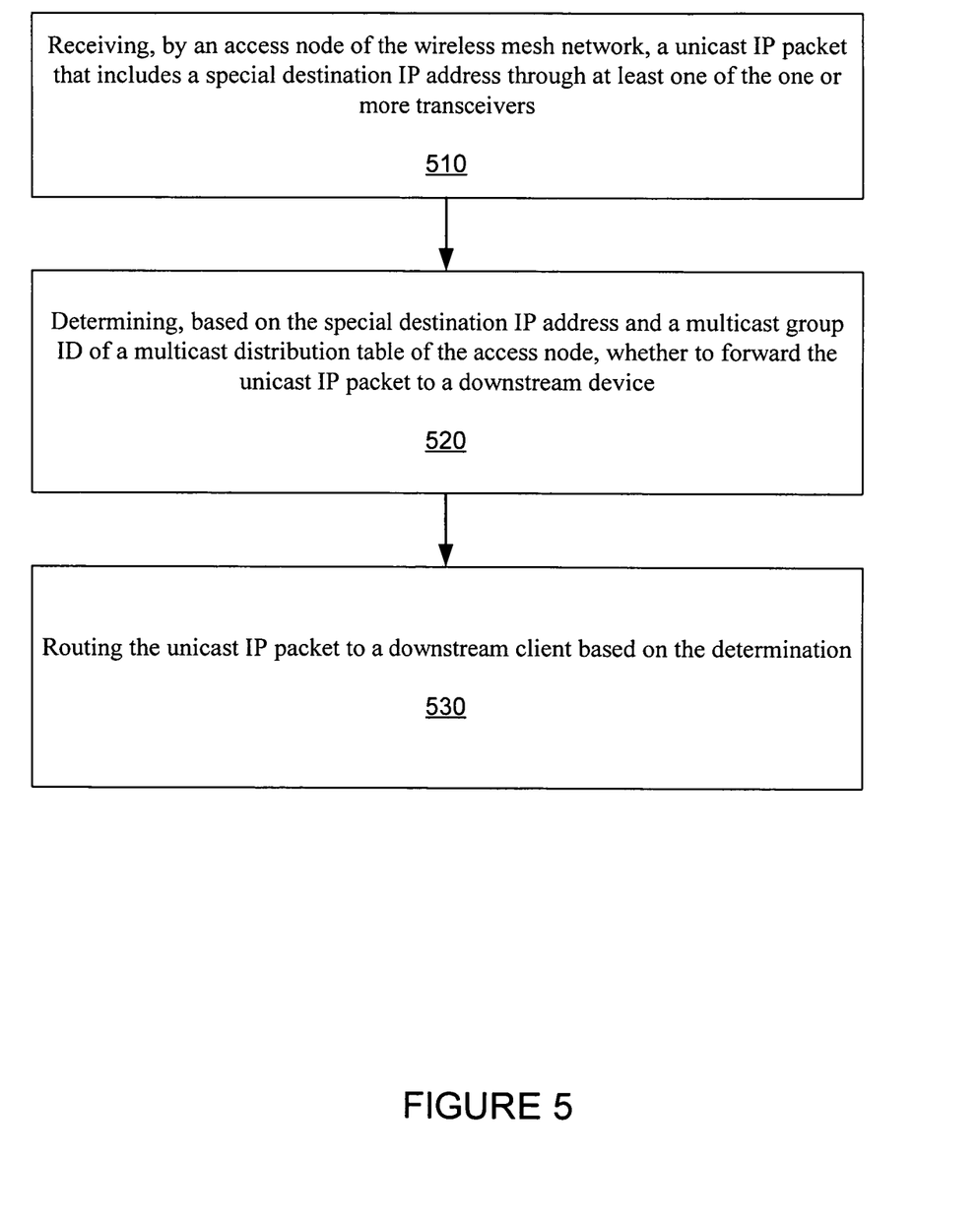
FIG. 5 is a flow chart that includes steps of a method of supporting multicast traffic of a wireless mesh network, according to an embodiment.

FIG. 5 is a flow chart that includes steps of a method of supporting multicast traffic of a wireless mesh network, according to an embodiment. A first step 510 includes receiving, by an access node of the wireless mesh network, a unicast IP packet that includes a special destination IP address through at least one of the one or more transceivers. A second step 520 includes determining, based on the special destination IP address and a multicast group ID of a multicast distribution table of the access node, whether to forward the unicast IP packet to a downstream device. A third step 530 includes routing the unicast IP packet to a downstream device based on the determination.

For an embodiment, the unicast IP packet includes the multicast group ID. For an embodiment, the special destination IP address uniquely corresponds with a specific multicast group ID. For an embodiment, the determination of whether to forward the unicast IP packet comprises identifying whether an IP address of the downstream device is within the multicast distribution table corresponding to the multicast group ID.

An embodiment further includes receiving, by the access node, one or more multicast membership notifications from one or more downstream devices, wherein each multicast membership notification includes a specific multicast group ID and a device IP address, and establishing entries in the multicast distribution table based on the one or more received multicast membership notifications and corresponding specific multicast group IDs.

An embodiment further includes receiving, by the access node, a user configuration from a network operator wherein the user configuration includes an indication that a client device connected to the access node is to receive specific multicast information associated with a specific multicast group identification (ID), and providing a multicast membership notification to any upstream access nodes and an upstream gateway, wherein the multicast membership notification includes the specific multicast group ID and a client address.

An embodiment further includes receiving, by the access node, multicast traffic from a multicast traffic source through the one or more transceivers, associating the multicast traffic with a second multicast group ID, and encapsulating the received multicast traffic in unicast IP packets that include a second special destination IP address associated with the second multicast group ID. An embodiment includes forwarding the unicast IP packets that include the second special destination IP address to an upstream device. An embodiment includes determining, based on the second special destination IP address of the unicast IP packet and a multicast group ID of the multicast distribution table, whether to forward the unicast IP packet to a second downstream device, and routing the unicast IP packet to the second downstream device based on the determination.

Figure 6:
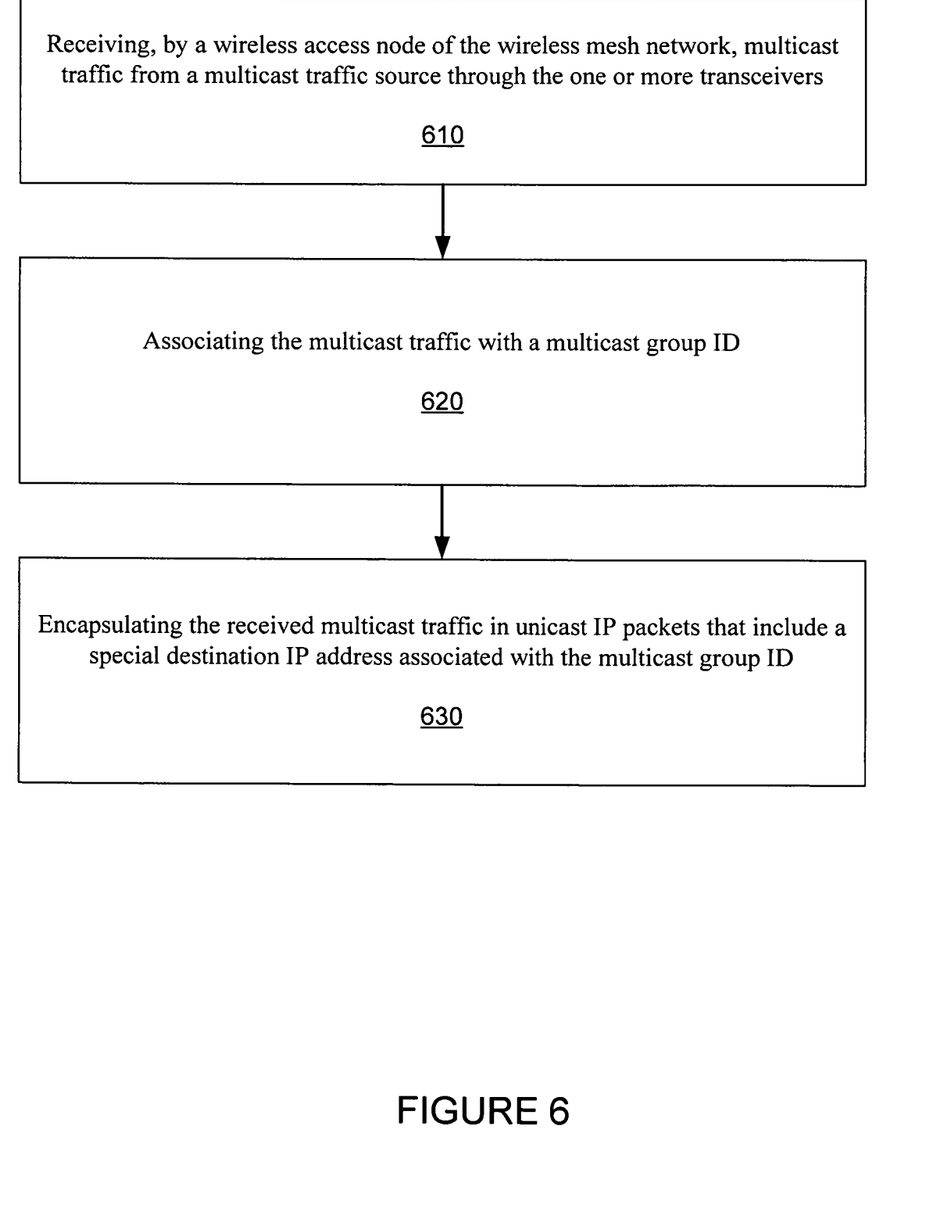
FIG. 6 is a flow chart that includes steps of a method of supporting multicast traffic of a wireless mesh network, according to another embodiment.

FIG. 6 is a flow chart that includes steps of a method of supporting multicast traffic of a wireless mesh network, according to another embodiment. A first step 610 includes receiving, by a wireless access node of the wireless mesh network, multicast traffic from a multicast traffic source through the one or more transceivers. A second step 620 includes associating the multicast traffic with a multicast group ID. A third step 630 includes encapsulating the received multicast traffic in unicast IP packets that include a special destination IP address associated with the multicast group ID. An embodiment includes forwarding the unicast IP packets that include the special destination IP address to an upstream device.

An embodiment further includes determining, based on the special destination IP address and a multicast group ID of a multicast distribution table, whether to forward the unicast IP packet to a downstream device, and routing the unicast IP packet to the downstream device based on the determination.

An embodiment further includes receiving, by a wireless access node of the wireless mesh network, a unicast IP packet that includes a second special destination IP address, determine, based on the second special destination IP address and a second multicast group ID of a multicast distribution table, whether to route the unicast IP packet to a second downstream device, and route the unicast IP packet to the second downstream device based on the determination.

For an embodiment, the multicast traffic is associated with the multicast group ID based on an interface of the wireless access node that receives the multicast traffic. For an embodiment, the multicast traffic is associated with the multicast group ID based on a protocol or port number or destination IP address contained in frames or packets of the multicast traffic.

An embodiment further includes receiving, by a wireless access node of the wireless mesh network, one or more multicast membership notifications from one or more downstream devices, wherein each multicast membership notifications include a specific multicast group ID and a device address. In one embodiment, the device address is an IP address. An embodiment includes establishing a multicast distribution table based on the one or more received multicast membership notifications and corresponding specific multicast group IDs.

As previously described, an embodiment includes receiving, by the wireless access node of the wireless mesh network, a user configuration from a network operator wherein the user configuration includes an indication that a device connected to the access node is to send or receive specific multicast information associated with a specific multicast group identification (ID), and providing a multicast membership notification to any upstream access nodes and an upstream gateway, wherein the multicast membership notification includes the specific multicast group ID and a device address. It is to be understood that a device that is part of a multicast group ID can originate or be the recipient of multicast traffic.

For at least some embodiments, the specific multicast information also includes the interface on which the device is connected to the access node, such as, wired Ethernet port, wireless 802.11, wireless Zigbee, etc. For at least some embodiments, the multicast membership notification provides an indicator to the access node that there is a listener (multicast receiving device) in its downstream path. For at least some embodiments, information within the multicast membership notification includes the MAC address of the access node where the device is connected to. Further, for at least some embodiments, the information of the multicast membership notification includes the multicast protocol information the device is subscribed to. This multicast membership notification is sent to the upstream node of the access node. For at least some embodiments, a routing table of the access node has information about which access node or gateway is its upstream node. The upstream node keeps this multicast membership notification and also the interface where the multicast membership notification is received from so that the upstream node knows where to send the multicast data to. The upstream node keeps this in multicast distribution table and uses it in conjunction with its routing table. For at least some embodiments, the multicast protocol information includes the data protocol (IP or non-IP) used by the multicast traffic (for example, IP/UDP, GOOSE, etc).

For an embodiment, the access node that receives the multicast traffic forwards the encapsulated received multicast traffic to an upstream access node or upstream gateway. For at least some embodiments, the access node or the other access node uses the mesh routing table to find the upstream node.

At least some embodiments further include the access node or another access node of the wireless mesh network receiving multicast traffic from a multicast traffic source, and the access node encapsulating the received multicast traffic in IP packets that include a special destination IP address. Exemplary multicast sources include a client device connected to an Ethernet interface of an access node that sends UDP data on a specific port number using broadcast/multicast IP address (255.255.255.255), or multicast IP address (for example, 224.x.y.z), or GOOSE protocol. The client device may also be connected to the wireless interface of access node. For at least some embodiments, encapsulating multicast data in a UDP packet means the multicast data is sent as the payload of a new IP/UDP packet. For at least some embodiments, the special destination IP address includes an IP address only known within the mesh network (for example, 10.11.12.13). It is sent and forwarded hop by hop (that is, access node to access node) and is processed by all access nodes using the multicast distribution table. For at least some embodiments, this special destination IP address is used in the destination field of the UDP header of the encapsulated packet. Also note that for at least some embodiments, this is unicast IP (that is, the encapsulated UDSP packet is always sent using 'unicast' hop by hop).

For an embodiment, the access node forwards a duplicate of the encapsulated received multicast traffic to a downstream device if the received multicast traffic matches previously received multicast protocol information of a downstream client device.

For at least some embodiments, the first gateway receives encapsulated received multicast traffic from a downstream device, the first gateway de-encapsulates the encapsulated received multicast traffic and multicasts or broadcasts de-encapsulated IP packet over a backhaul network connected to the first gateway. The gateway only receives encapsulated UDP packet from a downstream access node. After the UDP packet is de-encapsulated, the gateway broadcasts the payload (which is the multicast data) over, for example, the Ethernet when gateways of the wireless mesh networks are connected to an upstream network using Ethernet backhaul.

For at least some embodiments, when the access node roams to a different upstream device, the access node propagates the multicast membership notification upstream. For at least some embodiments, when access node with client device roams to a new access node, the new access node sends the multicast membership notification to a new upstream access node. The multicast membership notification is sent by the access node periodically to refresh the 'multicast distribution table' of the upstream nodes (upstream access nodes and gateways). The prior or old upstream nodes which no longer has the present access node of the client device, eventually removes the multicast distribution table since the prior access node is no longer having its table refreshed. It is possible that some periods will exist in which the multicast membership notification is still listed in the old upstream node. However, the old upstream node can always check its routing table whether the original access node MAC-address (in the multicast membership notification) is still in its downstream nodes using the mesh routing table before sending the encapsulated UDP packet downstream. If not, then the access node won't forward it downstream. For the situation in which a wireless client device that roams to another access node, can be treated similarly as the access node with the client device roams (described above).

Figure 7:
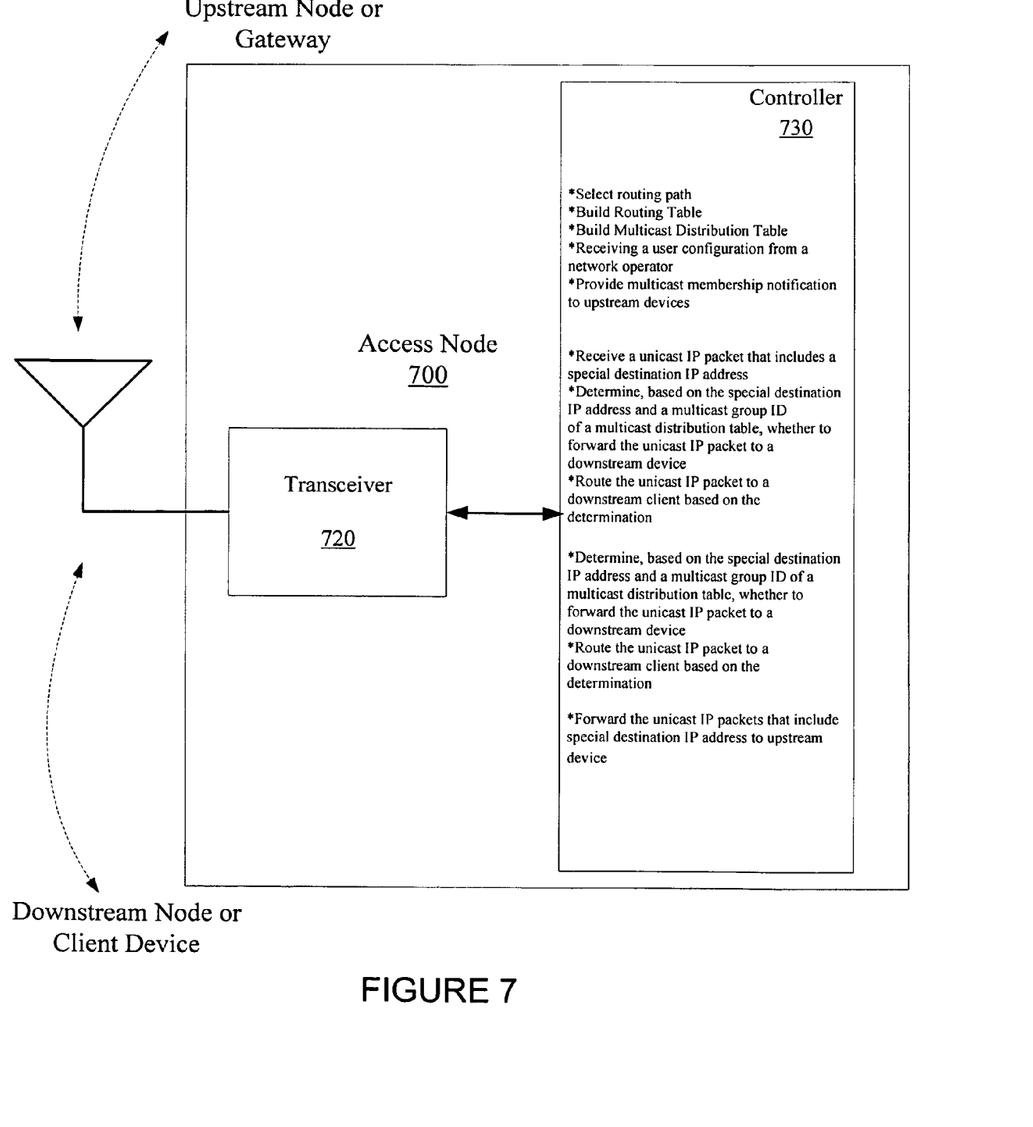
FIG. 7 show an access node and corresponding processor operations, according to an embodiment.

FIG. 7 show an access node 700, according to an embodiment. As shown, the access node 700 includes one or more transceivers (such as, transceiver 720) for communicating with an upstream access node or a first upstream gateway of a wireless mesh network, and a client device. The access node further includes a controller 730. For at least some embodiments, the controller 730 is operative to receive a user configuration from a network operator wherein the user configuration includes an indication that a client device connected to the access node is to receive specific multicast information, and provide a multicast membership notification to any upstream access nodes and a first upstream gateway, wherein the multicast membership notification includes multicast protocol information of the client device.

For at least some embodiments, the controller 730 is operative to select a routing path to an upstream gateway. As previously described, for an embodiment, the routing paths are selected based on a persistence of received routing beacons. For an embodiment, reverse beacons are transmitted upstream that include information of the selected route, allowing upstream devices to update their routing tables to allow the upstream devices to properly route data packets to the access node through the selected route. Accordingly, the access node maintains a routing table of downstream access nodes that have selected a routing path through the access node based on reverse routing beacons received from the downstream access nodes.

Further, the access node maintains a broadcast distribution table based on multicast membership notification received from downstream devices. As previously described, for an embodiment, each upstream access node propagates the multicast membership notification up through all upstream access nodes until provided to the first upstream gateway. Based on the broadcast distribution table and/or the routing table, the access node is able to determine whether to route and where to route broadcast traffic.

As shown, for the embodiment of FIG. 7, the processor 730 is operative to receive a unicast IP packet that includes a special destination IP address through at least one of the one or more transceivers 720, determine, based on the special destination IP address and a multicast group ID of a multicast distribution table, whether to forward the unicast IP packet to a downstream device, and route the unicast IP packet to the downstream device based on the determination. For an embodiment, the determination of whether to forward the unicast IP packet comprises identifying whether an IP address of the downstream device is within the multicast distribution table corresponding to the multicast group ID.

For an embodiment, the access node 700 is operative to forward the unicast IP packet to an upstream device if the unicast IP packet is received from a downstream device.

For an embodiment, the downstream device is at least one of directly downstream from the access node 700, or multiple hops downstream from the wireless access node 700. For an embodiment, the downstream device is at least one of another access node or a client device.

Normally, an access node receiving an IP packet extracts the destination IP address and consults the route table to determine the unique next hop to which the packet is to be forwarded. In the case of multicast traffic encapsulated inside unicast IP packets, the desired behavior is different—the forwarding decision needs to be based on the contents of the multicast distribution table and the packet may have to be duplicated and sent both upstream and downstream, including potentially individually to every downstream listener device that has the same multicast group ID as the multicast traffic in the encapsulated packet. Since the desired behavior is different for regular unicast IP packets and for unicast IP packets containing encapsulated multicast traffic, there needs to be a mechanism to indicate to each access node whether a unicast IP packet is of the former or latter variety. A special destination IP address (or addresses) known to the access nodes are used in this invention to provide this indication. A node that receives a unicast IP packet whose destination address is one of the known special destination IP addresses can be inferred, by the receiving access node, to be a unicast packet containing encapsulated multicast traffic. In an embodiment, the access node can also infer which multicast group ID the traffic belongs to, based on the specific special destination IP address. In an embodiment, the node can determine, based on the special destination IP address and the multicast distribution table, whether to forward the encapsulated multicast traffic downstream, and, if so, to which downstream devices.

The special destination IP address is used as an indicator in the IP header to allow a node that receives the packet to determine that the packet contains encapsulated multicast traffic. In an embodiment, the node is also able to use the special destination IP address to determine the multicast group ID of the encapsulated traffic. Upon making this determination, the node can then determine whether to forward the packet upstream or downstream or both, based on the multicast distribution table. It can also determine which multicast listener devices to forward the traffic to.

For an embodiment, the special destination IP address uniquely corresponds with a specific multicast group ID. For an embodiment, the unicast IP packet includes the multicast group ID. For an embodiment, the special destination IP address is uniquely assigned by a network operator. For an embodiment, the special destination IP address is uniquely generated by the wireless access node based on the specific multicast group ID.

As previously stated, for an embodiment, the processor 730 is further operative to receive one or more multicast membership notifications from one or more downstream devices, wherein each multicast membership notification includes a specific multicast group ID and a device IP address, and establish the multicast distribution table based on the one or more received multicast membership notifications and corresponding specific multicast group IDs.

Further, as previously described, for an embodiment, the multicast distribution table is propagated to upstream devices. For an embodiment, propagating the multicast distribution table to upstream devices includes appending information of the multicast distribution table to reverse routing beacons. For an embodiment, the multicast distribution table further includes the client address or device IP address, and next hop information.

As previously described, for at least some embodiments, the processor 730 is further operative to receive a user configuration from a network operator wherein the user configuration includes an indication that a client device connected to the access node is to receive specific multicast information associated with a specific multicast group identification (ID), and provide a multicast membership notification to any upstream access nodes and an upstream gateway, wherein the multicast membership notification includes the specific multicast group ID and a client address. The multicast membership notification is propagated upstream through all upstream access nodes and the upstream gateway, allowing each of the upstream access nodes and the upstream gateway to update their routing distribution tables, and properly route incoming multicast traffic.

For at least some embodiments, the processor 730 is further operative to receive multicast traffic from a multicast traffic source through the one or more transceivers 720, associate the multicast traffic with a second multicast group ID, and encapsulate the received multicast traffic in unicast IP packets that include a second special destination IP address associated with the second multicast group ID. For an embodiment, the multicast traffic is associated with the second multicast group ID based on an interface of the wireless access node that receives the multicast traffic. For an embodiment, the multicast traffic is associated with the second multicast group ID based on a protocol or port number contained in frames or packets of the multicast traffic.

For an embodiment, the access node 700 (processor 730) is further operative to forward the unicast IP packets that include the second special destination IP address to an upstream device. For an embodiment, the access node 700 (processor 730) is further operative to determine, based on the second special destination IP address of the unicast IP packet and a multicast group ID of the multicast distribution table, whether to forward the unicast IP packet to a second downstream device, and route the unicast IP packet to the second downstream device based on the determination.

Figure 8:
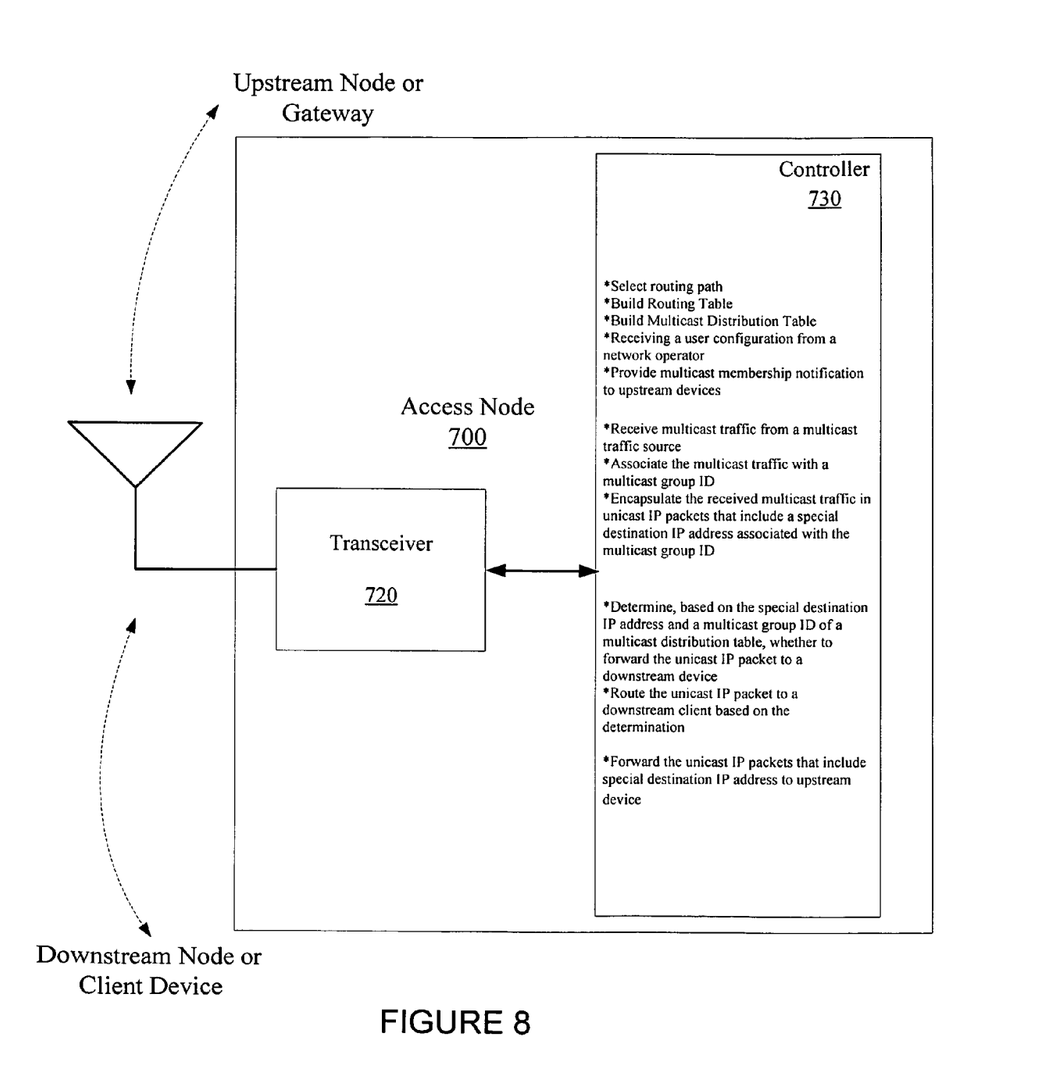
FIG. 8 show the access node and corresponding processor operations, according to another embodiment.

FIG. 8 show the access node and corresponding processor operations, according to another embodiment. The processing of embodiment of FIG. 8 can be additionally or alternatively processed by the controller 730. For at least some embodiments, the processor 730 is operative to receive multicast traffic from a multicast traffic source through the one or more transceivers, associate the multicast traffic with a multicast group ID, and encapsulate the received multicast traffic in unicast IP packets that include a special destination IP address associated with the multicast group ID.

For an embodiment, the multicast traffic is associated with the multicast group ID based on an interface of the wireless access node that receives the multicast traffic. For an embodiment the interface supports IP packets. For an embodiment, the interface supports non-IP traffic. For an embodiment, the multicast traffic is associated with the multicast group ID based on a protocol or port number contained in frames or packets of the multicast traffic. For an embodiment, the protocol or port typically supports Ethernet.

As previously stated, for an embodiment, the processor 730 is further operative to receive one or more multicast membership notifications from one or more downstream devices, wherein each multicast membership notifications include a specific multicast group ID and a downstream device IP address, and establish a multicast distribution table based on the one or more received multicast membership notifications and corresponding one or more specific multicast group IDs. As previously stated, for an embodiment, the multicast distribution table is propagated to upstream devices. As previously stated, for an embodiment, propagating the multicast distribution table to upstream devices comprises appending information of the multicast distribution table to reverse routing beacons. As previously stated, for an embodiment, the multicast distribution table further includes the downstream device IP address and next hop information. As previously stated, for an embodiment, the next hop information is determined at least in part on a routing table.

As previously stated, for an embodiment, the processor 730 is further operative to receive a user configuration from a network operator wherein the user configuration includes an indication that a client device connected to the access node is to receive specific multicast information associated with a specific multicast group identification (ID), and provide a multicast membership notification to any upstream access nodes and an upstream gateway, wherein the multicast membership notification includes the specific multicast group ID and a client address. As previously stated, for an embodiment, the processor 730 is further operative to forward the unicast IP packets that include the special destination IP address to an upstream device. As previously stated, for an embodiment, the processor 730 is further operative to determine, based on the special destination IP address and a multicast group ID of a multicast distribution table, whether to route the unicast IP packet to a downstream device, route the unicast IP packet to the downstream device based on the determination. As previously stated, for an embodiment, the special destination IP address uniquely corresponds with a specific multicast group ID. As previously stated, for an embodiment, the processor 730 is further operative the determination of whether to route the unicast IP packet comprises identifying whether an IP address of the downstream device is within the multicast distribution table corresponding to a specific multicast group ID.

As previously stated, for an embodiment, the processor 730 is further operative to receive a unicast IP packet that includes a second special destination IP address, determine, based on the second special destination IP address and a second multicast group ID of a multicast distribution table, whether to route the unicast IP packet to a second downstream device, and route the unicast IP packet to the second downstream device based on the determination. As previously stated, for an embodiment, the second special destination IP address uniquely corresponds with a specific multicast group ID. As previously stated, for an embodiment, the unicast IP packet includes the multicast group ID. As previously stated, for an embodiment, the special destination IP address is uniquely assigned by a network operator. As previously stated, for an embodiment, the special destination IP address is uniquely generated by the wireless access node based on the specific multicast group ID.

Although specific embodiments have been described and illustrated, the embodiments are not to be limited to the specific forms or arrangements of parts so described and illustrated.

What is claimed:

1. A wireless access node of a wireless mesh network, comprising:
    one or more transceivers for communicating with other devices of the wireless mesh network;
    a processor, the processor operative to:
        receive multicast traffic from a multicast traffic source through the one or more transceivers;
        associate the multicast traffic with a multicast group ID; and
        encapsulate the received multicast traffic in unicast IP packets that include a special destination IP address associated with the multicast group ID, wherein the special destination IP address is only known within the wireless mesh network,
    wherein the processor is further operative to:
        receive one or more multicast membership notifications from one or more downstream devices, wherein each multicast membership notifications include a specific multicast group ID and a downstream device IP address; and
        establish a multicast distribution table based on the one or more received multicast membership notifications and corresponding one or more specific multicast group IDs; and
        propagate the multicast distribution table to upstream devices,
    wherein the wireless access nodes is operative to directly or indirectly receive routing beacons from an upstream gateway, and wherein processor is further operative to select a route to the upstream gateway based on the received routing beacons, and transmit reverse routing beacons upstream that include information of the selected routing path, wherein propagating the multicast distribution table to upstream devices comprises appending information of the multicast distribution table to the reverse routing beacons.

2. The wireless access node of claim 1, wherein the multicast traffic is associated with the multicast group ID based on an interface of the wireless access node that receives the multicast traffic.

3. The wireless access node of claim 1, wherein the multicast traffic is associated with the multicast group ID based on a protocol or port number contained in frames or packets of the multicast traffic.

4. The wireless access node of claim 1, wherein the multicast distribution table further includes the downstream device IP address and next hop information.

5. The wireless access node of claim 1, wherein next hop information is determined at least in part on a routing table.

6. The wireless access node of claim 1, further comprising the processor operative to:
    receive a user configuration from a network operator wherein the user configuration includes an indication that a client device connected to the access node is to receive specific multicast information associated with a specific multicast group identification (ID); and
    provide a multicast membership notification to any upstream access nodes and an upstream gateway, wherein the multicast membership notification includes the specific multicast group ID and a client address.

7. The wireless access node of claim 1, further comprising the processor operative to forward the unicast IP packets that include the special destination IP address to an upstream device.

8. The wireless access node of claim 1, further comprising the processor operative to:
    determine, based on the special destination IP address and a multicast group ID of the multicast distribution table, whether to route the unicast IP packet to a downstream device;
    route the unicast IP packet to the downstream device based on the determination.

9. The wireless access node of claim 8, wherein the downstream device is at least one of directly downstream, or multiple hops downstream from the wireless access node.

10. The wireless access node of claim 8, wherein the downstream device is at least one another access node or a client device.

11. The wireless access node of claim 8, wherein the special destination IP address uniquely corresponds with a specific multicast group ID.

12. The wireless access node of claim 8, wherein the determination of whether to route the unicast IP packet comprises identifying whether an IP address of the downstream device is within the multicast distribution table corresponding to a specific multicast group ID.

13. The wireless access node of claim 1, further comprising the processor operative to:
 receive a unicast IP packet that includes a second special destination IP address;
 determine, based on the second special destination IP address and a second multicast group ID of the multicast distribution table, whether to route the unicast IP packet to a second downstream device; and
 route the unicast IP packet to the second downstream device based on the determination.

14. The wireless access node of claim 13, wherein the second special destination IP address uniquely corresponds with a specific multicast group ID.

15. The wireless access node of claim 14, wherein the special destination IP address is uniquely assigned by a network operator.

16. The wireless access node of claim 14, wherein the special destination IP address is uniquely generated by the wireless access node based on the specific multicast group ID.

17. The wireless access node of claim 13, wherein the unicast IP packet includes the multicast group ID.

18. A method of supporting multicast traffic of a wireless mesh network, comprising:
 receiving, by a wireless access node of the wireless mesh network, multicast traffic from a multicast traffic source through the one or more transceivers;
 associating the multicast traffic with a multicast group ID;
 encapsulating the received multicast traffic in unicast IP packets that include a special destination IP address associated with the multicast group ID, wherein the special destination IP address is only known within the wireless mesh network;
 receiving, by the wireless access node of the wireless mesh network, one or more multicast membership notifications from one or more downstream devices, wherein each multicast membership notifications include a specific multicast group ID and a device IP address;
 establishing a multicast distribution table based on the one or more received multicast membership notifications and corresponding specific multicast group IDs; and
 propagating the multicast distribution table to upstream devices,
 wherein the wireless access nodes directly or indirectly receives routing beacons from an upstream gateway, selects a route to the upstream gateway based on the received routing beacons, and transmits reverse routing beacons upstream that include information of the selected routing path, wherein propagating the multicast distribution table to upstream devices comprises appending information of the multicast distribution table to the reverse routing beacons.

19. The method of claim 18, wherein the multicast traffic is associated with the multicast group ID based on an interface of the wireless access node that receives the multicast traffic.

20. The method of claim 18, wherein the multicast traffic is associated with the multicast group ID based on a protocol or port number contained in frames or packets of the multicast traffic.

21. The method of claim 18, further comprising:
 receiving, by a wireless access node of the wireless mesh network, a user configuration from a network operator wherein the user configuration includes an indication that a client device connected to the access node is to receive specific multicast information associated with a specific multicast group identification (ID); and
 providing a multicast membership notification to any upstream access nodes and an upstream gateway, wherein the multicast membership notification includes the specific multicast group ID and a client address.

22. The method of claim 18, further comprising forwarding the unicast IP packets that include the special destination IP address to an upstream device.

23. The method of claim 18, further comprising:
 determining, based on the special destination IP address and a multicast group ID of the multicast distribution table, whether to forward the unicast IP packet to a downstream device;
 routing the unicast IP packet to the downstream device based on the determination.

24. The method of claim 18, further comprising:
 receiving, by the wireless access node of the wireless mesh network, a unicast IP packet that includes a second special destination IP address;
 determine, based on the second special destination IP address and a second multicast group ID of the multicast distribution table, whether to route the unicast IP packet to a second downstream device; and
 route the unicast IP packet to the second downstream device based on the determination.

* * * * *